US011289699B2

(12) United States Patent
Lang

(10) Patent No.: US 11,289,699 B2
(45) Date of Patent: Mar. 29, 2022

(54) CONDUCTIVE COATINGS FOR ACTIVE ELECTROCHEMICAL MATERIALS

(71) Applicant: Physical Sciences, Inc., Andover, MA (US)

(72) Inventor: Christopher M. Lang, Haverhill, MA (US)

(73) Assignee: Physical Sciences, Inc., Andover, MA (US)

( * ) Notice: Subject to any disclaimer, the term of this patent is extended or adjusted under 35 U.S.C. 154(b) by 0 days.

(21) Appl. No.: 16/545,655

(22) Filed: Aug. 20, 2019

(65) Prior Publication Data
US 2019/0372116 A1 Dec. 5, 2019

Related U.S. Application Data

(63) Continuation of application No. 14/847,679, filed on Sep. 8, 2015, now Pat. No. 10,511,018.
(Continued)

(51) Int. Cl.
*H01M 4/36* (2006.01)
*H01M 4/131* (2010.01)
(Continued)

(52) U.S. Cl.
CPC ......... *H01M 4/366* (2013.01); *H01M 4/0471* (2013.01); *H01M 4/131* (2013.01);
(Continued)

(58) Field of Classification Search
CPC .... H01M 4/0471; H01M 4/131; H01M 4/136; H01M 4/139; H01M 4/366; H01M 4/386;
(Continued)

(56) References Cited

U.S. PATENT DOCUMENTS 6,372,386 B1 4/2002 Cho et al.
2009/0117461 A1* 5/2009 Shembel ................ H01M 4/06
429/217
(Continued)

FOREIGN PATENT DOCUMENTS

CA 2433670 A1 7/2002
WO 02054515 A2 7/2002

OTHER PUBLICATIONS

Chang et al., "Highly Stable Anodic Green Electrochromic Aromatic Polyamides: Synthesis and Electrochromic Properties", Journal of Materials Chemistry, Feb. 2007, 17, pp. 1007-1015.

*Primary Examiner* — Adam A Arciero
(74) *Attorney, Agent, or Firm* — Iandiorio Teska & Coleman, LLP

(57) ABSTRACT

A method for producing a coated powder including homogeneously mixing an electrochemically active material including electrochemically active particles with nanosize particles in a ratio determined by the surface area of the electrochemically active particles to form a homogeneous powder, adding a polymer and mixing to form a homogeneous solid mixture, adding a solvent to dissolve the polymer and form a viscous slurry, mixing the viscous slurry, and drying the viscous slurry to cause the nanosize particles to become localized adjacent to an outer surface of the electrochemically active particles with the polymer maintaining the proximity between the nanosize conductive particles and the outer surface of the electrochemically active particles.

8 Claims, 12 Drawing Sheets

Related U.S. Application Data

(60) Provisional application No. 62/047,117, filed on Sep. 8, 2014.

(51) Int. Cl.
| | |
|---|---|
| *H01M 4/136* | (2010.01) |
| *H01M 4/139* | (2010.01) |
| *H01M 4/04* | (2006.01) |
| *H01M 4/62* | (2006.01) |
| *H01M 4/58* | (2010.01) |
| *H01M 4/525* | (2010.01) |
| *H01M 4/38* | (2006.01) |

(52) U.S. Cl.
CPC ............ *H01M 4/136* (2013.01); *H01M 4/139* (2013.01); *H01M 4/625* (2013.01); *H01M 4/386* (2013.01); *H01M 4/525* (2013.01); *H01M 4/5825* (2013.01); *H01M 4/622* (2013.01)

(58) Field of Classification Search
CPC .... H01M 4/525; H01M 4/5825; H01M 4/622; H01M 4/625
See application file for complete search history.

(56) References Cited

U.S. PATENT DOCUMENTS

| | | |
|---|---|---|
| 2012/0156555 A1 | 6/2012 | Hojo et al. |
| 2013/0330630 A1* | 12/2013 | Christensen ............ H01M 4/13 429/231.95 |
| 2014/0027257 A1 | 1/2014 | Albrecht et al. |
| 2014/0346618 A1* | 11/2014 | Lahlouh ............... H01M 4/625 257/414 |

* cited by examiner

CONDUCTIVE COATINGS FOR ACTIVE ELECTROCHEMICAL MATERIALS

CROSS-REFERENCE TO RELATED APPLICATIONS

This application is a continuation application of U.S. patent application Ser. No. 14/847,679, filed Sep. 8, 2015, which claims benefit of and priority to U.S. Provisional Application Ser. No. 62/047,117, filed Sep. 8, 2014 under 35 U.S.C. §§ 119, 120, 363, 365 and 37 C.F.R. §§ 1.55 and 1.78, and both applications are incorporated herein by reference.

BACKGROUND OF THE INVENTION

Coating of active materials with conductive layers has been widely investigated as a means for improving conductivity and performance. The majority of these coatings are formed through a high temperature graphitization process. In a traditional graphitization process, the active materials are coated with a precursor which upon high temperature exposure is graphitized to form a thin, very electrically conductive layer on the surface of the particles. For thermally stable materials, such as $LiFePO_4$, a traditional graphitization process is effective in improving the electrical conductivity and the resulting electrode performance. However, for less stable materials, such as $LiNixCoyAlzO_2$ (NCA) or silicon, the high temperature processing can lead to interfacial reactions that inhibit the performance of the final processed material. Finally, the traditional high temperature coating process results in a dense electrically conductive layer that does not enable, and moreover may inhibit ion transport. Efficient electrochemical performance requires rapid electron and ion flow which the traditional high temperature processes do not provide.

SUMMARY OF THE INVENTION

The disclosed invention relates to materials that are used as the active component in electrochemical devices. In particular, the subject invention improves the electrical and ionic conductivity of silicon anode, lithium metal oxide and phosphate cathode materials used in lithium ion cells. The disclosed invention can reduce the amount of binder and conductive additive required, thereby increasing the active material content and the energy density of a constructed cell. The disclosed invention can lead to a reduction in the solvent required for electrode production resulting in reduced manufacturing costs.

The subject invention features a rapid, low cost, low temperature process for forming an electrically and ionically conductive coating on the surface of electrochemically active materials. In the developed process the active material is coated with nanosized conductive particles. For example, acetylene black, carbon black, graphene, and/or metal nanoparticles may be used as the conductive particles. In some embodiments, the nanosized conductive particles can be particles coated with an electroactive polymer, or a material with voltage dependent electrical resistivity. Interparticle cohesive forces between the large and small particles maintain the small particles at the surface of the large active material particle in the dry state. The coating is maintained during the mixing that occurs during preparation of the coating slurry by including a polymer component that is insoluble in the solvent from which the active material will be cast to form the final electrode. The conductor/polymer coating provides a porous layer on the surface of the active material thus allowing ion transport even on full densification. Additionally, the polymer can be selected to provide porosity, thus enhancing lithium ion transport. For example, polyethylene glycol (PEG) was used as the polymer for coating lithium metal oxides and phosphates due to its poor solubility (less than 0.002 g/1 kg NMP) let N-methylpyrrolidinone (NMP), the typical solvent for casting electrodes with these materials.

The insoluble polymer can be formed by precipitation of a soluble polymer through pH modification or by the addition of a nonsolvent. In contrast, for a traditional process, a solution of the polymer and a solvent is added to just wet the solid mixture. Once a homogeneous mixture is formed, the solvent is evaporated employing heat and/or vacuum. Use of solvents such as chloroform allows for drying under vacuum and inert conditions minimizing potential side reactions. The resulting dry coated powder is collected, sieved as necessary, and utilized to form electrodes. The polymer may also be incorporated by melting it and forming a homogeneous mixture with the solid components. Due to the conductive and porous nature of the resulting coating, a higher proportion of active material can be used so long as the electrode is calendared to ensure connection between the coated active material surfaces. The porosity imparted by the coating at the surface of the electrochemically active material enables electrolyte uptake and ion flow under high density electrode conditions. The low processing temperatures prevent decomposition of the polymer. Additionally, side reactions with the active materials are minimized due to the reduced surface area in contact with the electrolyte.

In a traditional coating method, a slurry is formed where the active material and conductor are dispersed in a binder matrix. The conductor is dispersed to such a level to ensure electron percolation. PEG (or similar non-soluble polymers) would not be added to a slurry as they would participate and/or not dissolve, thereby forming an inhomogeneous mixture that would not cast uniformly. A non-uniform electrode leads to inconsistent and poor cell performance.

Additionally, in traditional coating methods, coatings are applied by decomposing carbon to graphite on a material surface. This has two problems. The coatings are dense and high temperatures are required. The high active coating of the present invention makes use of available conductors and/or high surface area particles that can be coated to make (variably) conductive particles. These particles will not pack perfectly on the surface of the electrochemically active particles, thus providing a porous surface on the active material. Advantageously, the high active coating techniques of the present invention provide a homogeneous coated particle that remains so during the slurry processing and casting steps.

In one aspect, the invention features a method for producing a coated powder. The method includes homogeneously mixing an electrochemically active material including electrochemically active particles with nanosize particles in a ratio determined by the surface area of the electrochemically active particles to form a homogeneous powder. The method also includes adding a polymer and mixing to form a homogeneous solid mixture. The method also includes adding heat to the homogenous solid mixture to cause the polymer to melt and form a viscous shiny. The method also includes mixing the viscous slurry. The method also includes cooling the viscous shiny to cause the nanosize particles to become localized adjacent to an outer surface of the electrochemically active particles with the polymer maintaining the proximity between the nanosize conductive particles and the outer surface of the electrochemically active particles.

In some embodiments, the nanosize particles are conductive particles. In some embodiments, the nanosize particles are particles having a variable conductivity. In some embodiments, the conductive particles are localized within approximately 200 nm of the electrochemically active particles. In some embodiments, the polymer has a solubility of less than 0.002 g/Kg casting solvent. In some embodiments, the conductive particles have a size in the range of 5-50 nm. In some embodiments, the electrochemically active material is at least one of $LiCoO_2$, NCA, NCM-111, NCM-523, NCM-622, or a lithium metal phosphate. In some embodiments, the nanosize conductive particles are carbon black.

In another aspect, the invention features a method for producing a coated powder. The method includes homogeneously mixing an electrochemically active material including electrochemically active particles with nanosize particles in a ratio determined by the surface area of the electrochemically active particles to form a homogeneous powder. The method also includes adding a polymer and mixing to form a homogeneous solid mixture. The method also includes adding a solvent to dissolve the polymer and form a viscous slurry. The method also includes mixing the viscous slurry. The method also includes drying the viscous slurry to cause the nanosize particles to become localized adjacent to an outer surface of the electrochemically active particles with the polymer maintaining the proximity between the nanosize conductive particles and the outer surface of the electrochemically active particles.

In some embodiments, the nanosize particles are conductive particles. In some embodiments, the nanosize particles are particles having a variable conductivity.

In some embodiments, the conductive particles are localized within approximately 200 nm of the electrochemically active particles. In some embodiments, the polymer has a solubility of less than 0.002 g/Kg casting solvent. In some embodiments, the conductive particles have a size in the range of 5-50 nm. In some embodiments, the electrochemically active material is at least one of $LiCoO_2$, NCA, NCM-111, NCM-523, NCM-622, or a lithium metal phosphate. In some embodiments, the nanosize conductive particles are carbon black.

In yet another aspect, the invention features a coated powder for use in the production of an electrode. The coated powder includes a plurality of electrochemically active particles. The coated powder also includes a particle shell. The coated powder also includes a polymer configured to maintain the particle shell in proximity to the plurality of electrochemically active particles.

In some embodiments, the particle shell comprises conductive particles. In some embodiments, the particle shell comprises particles having a variable conductivity. In some embodiments, the particle shell comprises particles that are localized within approximately 200 nm of the plurality of electrochemically active particles. In some embodiments, the electrochemically active particles are at least one of $LiCoO_2$, NCA, NCM-111, NCM-523, NCM-622, or a lithium metal phosphate. In some embodiments, the particle shell comprises carbon black. In some embodiments, the particle shell comprises conductive particles having a size in the range of 5-50 nm. In some embodiments, the polymer has a solubility of less than 0.002 g/kg of N-methylpyrrolidinone. In some embodiments, the polymer is polyethylene glycol.

In yet another aspect, the invention features a method for producing an electrode for use in an electrochemical cell by utilizing a coated powder, the coated powder comprising a polymer, an active material, and nanosized conductive particles. The method includes homogeneously mixing the coated powder together with a binder. The method also includes adding a solvent to the mixture to form a solution, wherein the solvent does not dissolve the polymer or affect the proximity between the nanosized conductive particles and the outer surface of the active particles. The method also includes mixing the solution to form a slurry. The method also includes drying the slurry to form an electrode. The method also includes calendaring the electrode to increase the electrode density. In some embodiments, the method also includes adding a conductor to the solution.

As used herein, the terms "approximately," "roughly," and "substantially" mean ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed invention.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
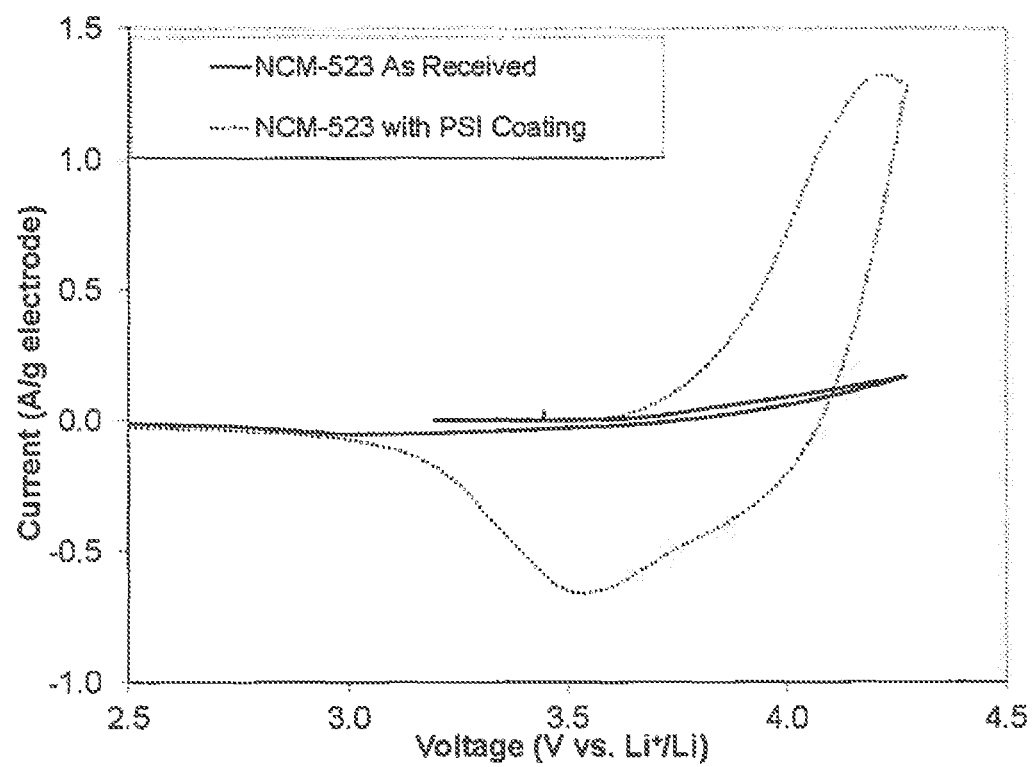
FIG. 1 is a graph showing measured electrode current plotted against a scanning voltage for both a traditional electrode and an electrode coated according to the present invention.

The disclosed invention solves the problem of limited electrical conductivity in electrochemically active materials by applying an electrically conductive coating to the surface of the electrochemically active material using a rapid and scalable low temperature process. The subject invention is applicable to electrochemical applications where conductive particles are added to ensure electron percolation. The disclosed invention has been demonstrated for battery applications. For example, Physical Sciences Inc. (PSI), the assignee of the subject application has demonstrated the ability to apply coatings to lithium metal oxide, lithium metal phosphate, and silicon materials that improve the electrical conductivity and performance of the materials. The mass fraction of the coating is sufficiently low as to not impact the material performance while allowing the coated materials to be used without the addition of conductive additives that are currently employed to form high performance electrodes. The elimination or reduction of the required amount of conductor allows for increased active material and reduced binder and solvent. The increased active material improves electrode and cell energy density while reducing manufacturing costs and environmental impact. Further, the reduction in the conductor levels reduces the surface area of the electrode and corresponding negative reactions with the electrolyte. This improves the electrode performance at elevated voltages allowing for an increased voltage operating range and improved energy density. PSI has demonstrated the performance in half and full cells. Pouch cell demonstrations illustrate the scalability of the approach.

The subject invention features a rapid, low cost, low temperature process for forming, an electrically and ionically conductive coating on the surface of electrochemically active materials. In the developed process the active material is coated with nanosized conductive particles and a polymer. The total weight percentage of the coating is minimized in order to limit the impact on the active material capacity. The exact percent is dependent on the active material size (surface area) and the desired properties. For example, for commercially available metal oxide cathode materials, PSI has demonstrated that a coating mass fraction of 1% gives the desired performance. For an experimental metal phosphate cathode material a mass fraction of 2% was required to achieve the desired results. This is due to the reduced primary particle size and electrical properties of the phosphate material. The results shown in FIGS. 1-3 were demonstrated with 1-2% coatings. The test results do not attempt to correct for the coating fraction. It is assumed the coated powder will be treated as the initial powder was and therefore no adjustments are made for the slightly reduced active material content. The polymer is selected so as to maintain the coating during the casting process. Example coating procedures and test results are shown below.

Coating of lithium metal oxide cathode materials has been carried out in accordance with the disclosed invention. A 1% coating was performed as follows. 9.9 grams of BASF's NCM-523 cathode material was mixed with 0.085 grams of carbon black (Timcal's SuperP) using a Resodyn acoustic mixture. The powder mixture was mixed for 2 minutes at 80% intensity, providing a homogeneous mixture of carbon and active material. 2.8 ml of chloroform was then added to the homogeneous solid mixture along with 0.015 g of polyethylene glycol (PEG) (IOK molecular weight) dissolved in 0.15 ml of chloroform. The resulting solution was mixed in the Resodyn for 30 seconds at a time. In total a minimum of 2 30 second mixing steps were performed. The resulting slurry was then allowed to dry in a vacuum at 100 degrees Celsius. Evaporation of the solvent can be performed while mixing by attaching a vacuum feed to the mixing cup top. Additional conductors, such as metal nanoparticles, high surface area components, such as fumed silica, lithium salts, or electroactive polymer components can be included to provide additional functionalities. Nanoparticles that are selectively conductive can be used to provide reversible safety protection as demonstrated in U.S. patent application Ser. No. 13/835,572.

Once dry, the PEG serves to hold the high surface area nano-particles to the surface of the active material during the electrode preparation process. Electrode preparation with the coated powder is carried out using the same techniques as with the uncoated powder. In a traditional procedure the active material, conductive additive (typically carbon black and graphite) and binder (typically PVDF) are dispersed in NMP to form a homogeneous slurry. A traditional procedure may utilize 90% active material, 2.5% carbon black, 2.5% graphite, and 5% PVDF binder. The mass loading of the solids (active material, binder, and carbon) is typically about 50-60%.

The electrodes are cast at the desired thickness, dried, and calendared to increase the density. Electrodes prepared with the coated powder demonstrate equivalent or enhanced performance, depending on the rate of operation.

In a traditional formulation, the conductor is added due to the low electronic conductivity of the active material. The surface area of the carbon black however can be >100× that of the active material. Similarly, surface area of the graphite can be >40× of the active material. In the final slurry this can account for more than 50% of the total surface area increasing the amount of binder and solvent required to maintain adhesion and cohesion. Further, the conductor ends up dispersed throughout the binder, increasing the amount required for electron percolation. In contrast, for PSI's coated material the conductor is located only at the surface (e.g., a conductor with a size of about 40 nm can be within 100-200 nm of the surface) of the coated powder where it is required to facilitate electron insertion and removal from the active material. Dense calendaring of the electrode is required to achieve electronic and ionic conduction. The nature of the disclosed coating allows for dense calendaring. With traditional dense graphitic coatings, dense calendaring would reduce the available volume for ion movement limiting electrochemical performance. The present invention addresses this problem as the presence of the polymer interacting with the electrolyte ensures sufficient ion transport during cell operation.

The poor conductivity of the base materials and increased performance of the coated powder can be demonstrated by preparing an electrode with no additional conductor. To do this, 98% of the NCM-523 active material or coated powder was mixed with 2% PVDF binder. Only 2% binder was required due to the low surface area of the active material before and after coating. Further tests have shown the binder can be reduced to 1%. Once the electrodes were cast, dried, and calendared, half-cells versus lithium metal were prepared to demonstrate the performance. FIG. 1 shows cyclic voltammetry (CV) results for electrodes using the as received and coated NCM-523 powders. The results shown in FIG. 1 demonstrate the impact of PSI's coating on the performance of electrodes formed without additional conductor. The results highlight the ability of the coating to increase the electrical conductivity of the material and provide for reversible lithium ion insertion and removal. For the as received powder, only a very minor oxidation current (positive currents) is observed as the potential exceeds 3.7 V vs. Li+/Li. No accompanying reduction current is observed on scan reversal signaling that the oxidation most likely corresponds to electrolyte degradation at the surface. In contrast, the cell with the PSI coated material shows a distinct oxidation peak and corresponding reduction peaks signaling the oxidation and reduction of the metal oxide (corresponding to lithium removal and reinsertion). Further, the max current exceeds 1 A/g corresponding to a rate performance of greater than 6 C (a 1 C rate corresponds to a rate at which a cell would be fully charged after one hour). The increased rate performance is sufficient for many moderate to low rate lithium ion applications.

Figure 2:
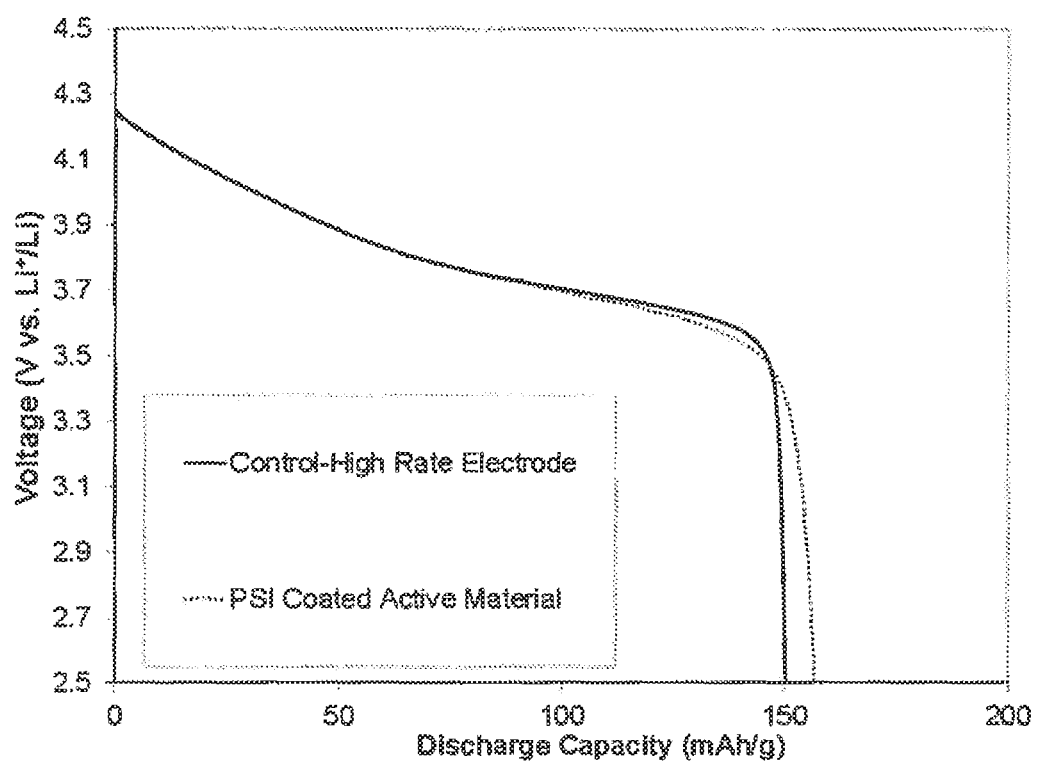
FIG. 2 is a graph showing measured half-cell voltage plotted against discharge capacity for both a traditional electrode and an electrode coated according to the present invention.

The impact of the coating on rate performance was further demonstrated by performing discharge rate testing. FIG. 2 compares the 1 C discharge performance of two different electrode systems—one with PSI's coated active material and the other a control high rate electrode. The baseline high rate electrode is formed with 88% uncoated active material and 8% conductor to ensure electrical conduction. The electrode with the PSI coated material contains 98% coated active material, with no added conductor. The results shown in FIG. 2 are normalized to the weight of the active material. No attempts are made to adjust for the coating concentration in the case of the coated material. FIG. 2 shows that the electrode with the coated material delivers equivalent performance to the optimized high rate electrode up to a capacity of about 100 mAh/g. At a discharge capacity of about 100 mAh/g, a slight reduction in voltage is observed, but overall the electrode with the coated material delivers a greater total capacity. Further optimization of the density could allow for an increase in discharge voltage at the end of the discharge. Note again that the capacities are normalized to the active material. As such, the electrode with the PSI coated material actually delivers about 10% more capacity per gram of coating than the optimized high rate electrode. The increased capacity can lead to increased battery energy densities.

Additional tests have demonstrated the ability to scale-up the coating techniques and produce electrodes for pouch cells. These electrodes maintain the required adhesion and performance for integration and testing in all cell sizes.

Figure 3:
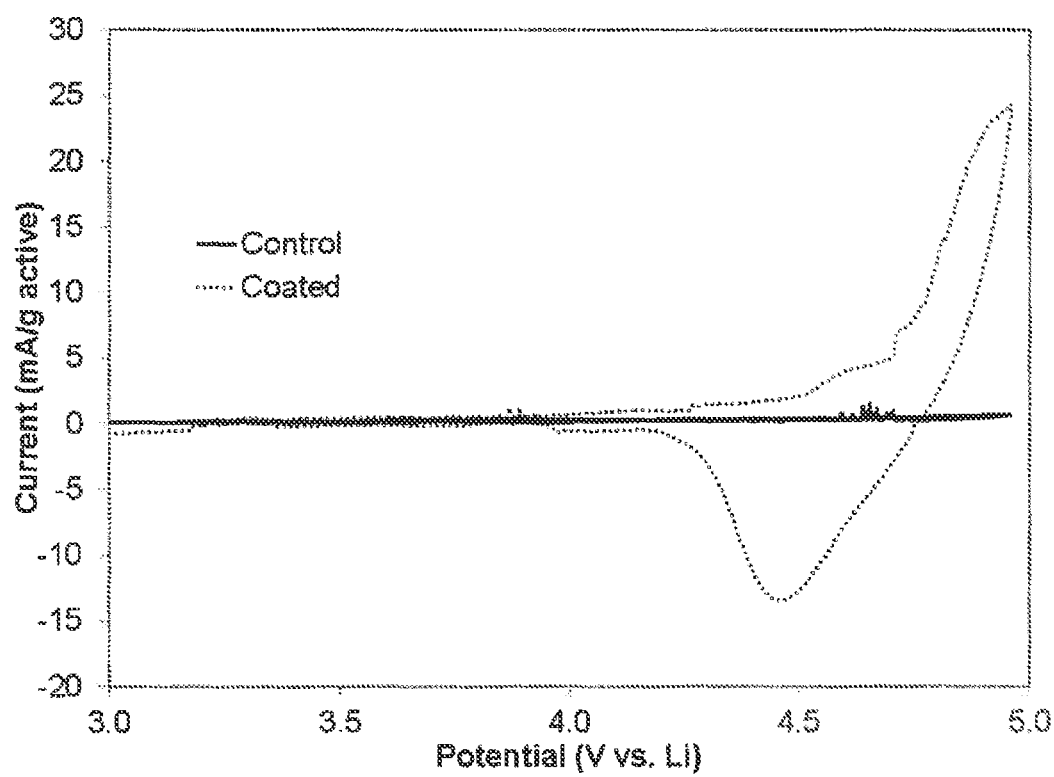
FIG. 3 is a graph showing measured electrode current plotted against a scanning potential for both a traditional $LiCoPO_4$ electrode and a $LiCoPO_4$ electrode coated according to the present invention.

The impact of the coating on the performance of a lithium metal phosphate electrode was demonstrated by applying a 2% coating to $LiCoPO_4$ powder synthesized at PSI. The 2% coating was applied using the same procedure outlined previously, but with the ratios adjusted to double the amount of PEG and Super P. FIG. 3 shows CV results for electrodes formed with the as prepared and coated $LiCoPO_4$ materials. The results shown in FIG. 3 demonstrate the impact of PSI's coating on the performance of $LiCoPO_4$ electrodes formed without additional conductor. The results highlight the ability of the coating to increase the electrical conductivity and provide for reversible lithium ion insertion and removal. No additional conductor was added for either electrode. Without the coating no oxidation or reduction is observed due to the negligible electrical conduction of $LiCoPO_4$. In contrast, the PSI coated $LiCoPO_4$ electrode shows a distinct oxidation and reduction and a greater than 40× increase in the current. The increased current clearly demonstrates the ability of the coating to facilitate electron and ion transfer to and from the metal oxide material. These coatings could enable practical application of the $LiCoPO_4$ chemistry.

PEG can be substituted for a water soluble polymer such as PVDF. The limited solubility of PEG in NMP allows the initially developed process to maintain adhesion of the coating in NMP processed slurries. NMP processed slurries are the preferred casting medium for the majority of current lithium ion cathode materials. However, there is a push to transition to water based casting solutions. Further, several anode materials are already processed in water. The PEG may similarly function in these solutions, but the increased solubility could lead to reduced adhesion strength. The reduced adhesion strength could lead to loss of conductive particles from the surface, limiting the effectiveness of the coating in minimizing the required conductor.

For the stated reasons, PSI developed a water based process for coating silicon or similar type active materials. The process developed for coating PSI's high surface area silicon composite material was as follows. For materials of lower surface area the carbon to active material ratios could be significantly lowered. In this example, 0.80 grams of silicon composite (or similar active material) was mixed with 0.07 grams of SuperP by hand, in the shear mixer, and/or with the Resodyn mixer. 0.5 grams of 4% sodium carboxymethycellulose (CMC) solution was then added to the solid mixture along with 4 grams of water to form a slurry. The slurry was mixed at 3450 RPM for 5 minutes using a Flacktek Shear mixer to ensure a uniform distribution. The solution was then sonicated for 15 minutes and mixed again in the shear mixer for 5 minutes.

Finally, about 1 gram of diluted sulfuric acid (1/10 dilution of 70% sulfuric acid) was added to the mixture. The purpose of the acid was to drop the pH below 2, protonating the CMC and precipitating it from the solution around the silicon/carbon mixture. The slurry was again mixed for 5 minutes, sonicated for 30 minutes and finally mixed for 5 additional minutes.

The slurry was then filtered to remove residual acid and the sodium salt formed on interaction with the sulfuric acid. The slurry cake was dried in a heated vacuum oven to remove residual water. Note that the product may also be recovered by using a centrifuge or addition of an alcohol (such as isopropanol) to precipitate the polymer. The powder was sieved to 212 microns after drying the slurry cake. Electrodes could be formed with reduced carbon levels (4% versus 11%) while demonstrating enhanced electrochemical properties.

Figure 4:
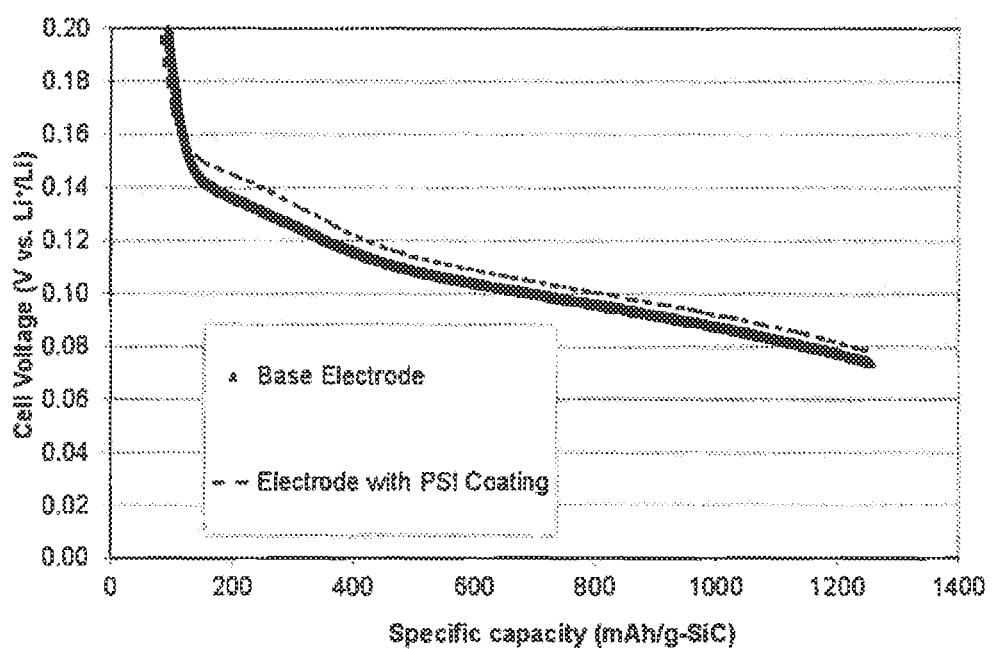
FIG. 4 is a graph showing cell voltage plotted against specific capacity for both a traditional silicon composite electrode and a silicon composite electrode coated according to the present invention.

FIG. 4 shows the performance of coated and uncoated silicon half-cells. In more detail, FIG. 4 shows the voltage versus capacity on lithiation of silicon electrodes with and without PSI's coating applied. The PSI coating reduces the resistance at the surface of the silicon composite anode material, thereby increasing the observed lithiation voltage and improving the reversibility. In each case, the active material content is about 80% by mass. However, the coating provides for increased electrical conductivity and activity as signaled by an increase in the lithiation voltage as shown in FIG. 4. This also translates to an increased reversibility with the electrode, with the coated material delivering 1059 mAh/g-SiC vs. 1030 mAh/g-SiC without the coating. Similar coatings may be applied to the entire range of active materials to increase the performance of the cells.

Figure 5A:
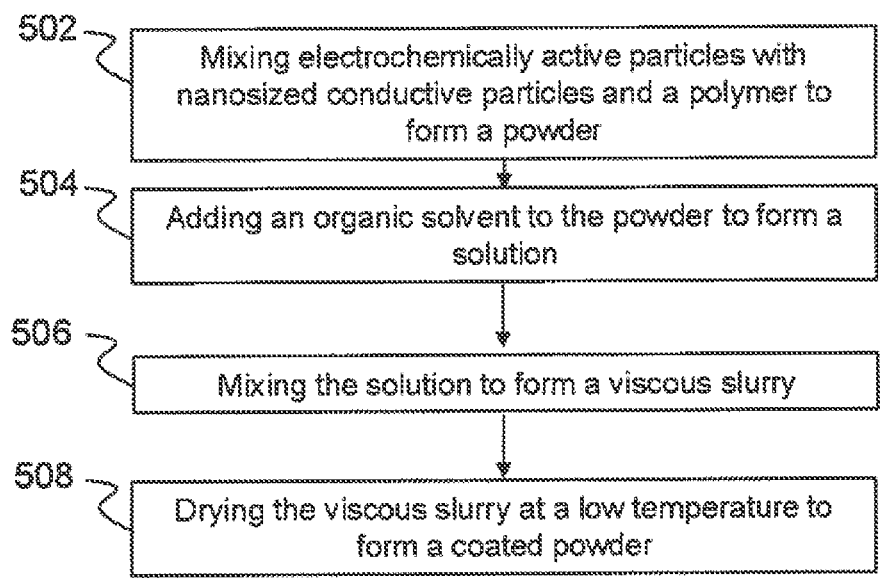
FIG. 5A shows a flowchart illustrating a method for producing a coated powder according to the invention.

FIG. 5A describes a method for producing a coated powder according to the invention. The method includes homogeneously mixing electrochemically active particles with nanosize conductive particles in a ratio determined by the surface area of the electrochemically active particles to form a homogeneous powder. The electrochemically active material can be a lithium metal oxide such as BASF's NCM-111, NCM-S23, or a lithium metal phosphate such as $LiCoPO_4$ and the nanosize conductive particles can be carbon black, such as Timcal's SuperP. The polymer(s) may be incorporated into the solid mixture or added by first dissolving in an organic solvent to form a solution. The polymer can be chosen based on molecular weight and solubility. Any or all of the components may be predispersed or dissolved in solvents to ensure proper mixing during the resulting steps. The method also includes mixing the solution to form a viscous slurry. The method also includes drying the viscous slurry at a temperature of up to 100 degrees Celsius to cause the nanosize conductive particles to become localized adjacent to an outer surface of the electrochemically active particles with the polymer maintaining the proximity between the nanosize conductive particles and the outer surface of the electrochemically active particles.

Figure 5B:
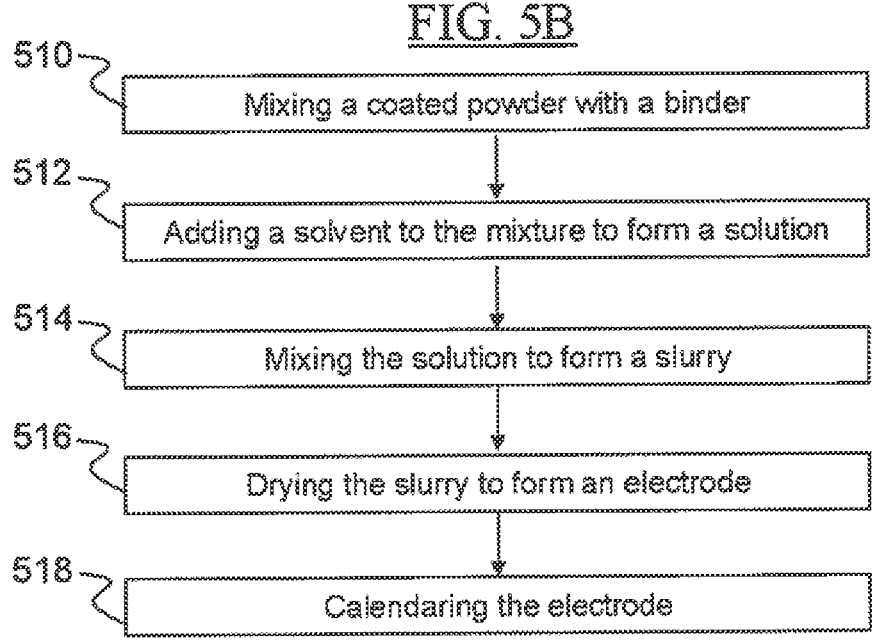
FIG. 5B shows a flowchart illustrating a method for creating an electrode in accordance with the subject invention.

FIG. 5B describes a method for producing an electrode for use in an electrochemical cell by utilizing a coated powder, the coated powder comprising a polymer, an active material, and nanosized conductive particles. The method includes homogeneously mixing the coated powder together with a binder. The method also includes adding a solvent to the mixture to form a solution, wherein the solvent does not dissolve the polymer or affect the proximity between the nanosized conductive particles and the outer surface of the active particles. The method also includes mixing the solution to form a slurry. The method also includes drying the slurry to form an electrode. The method also includes calendaring the electrode to increase the electrode density.

Figure 6A:
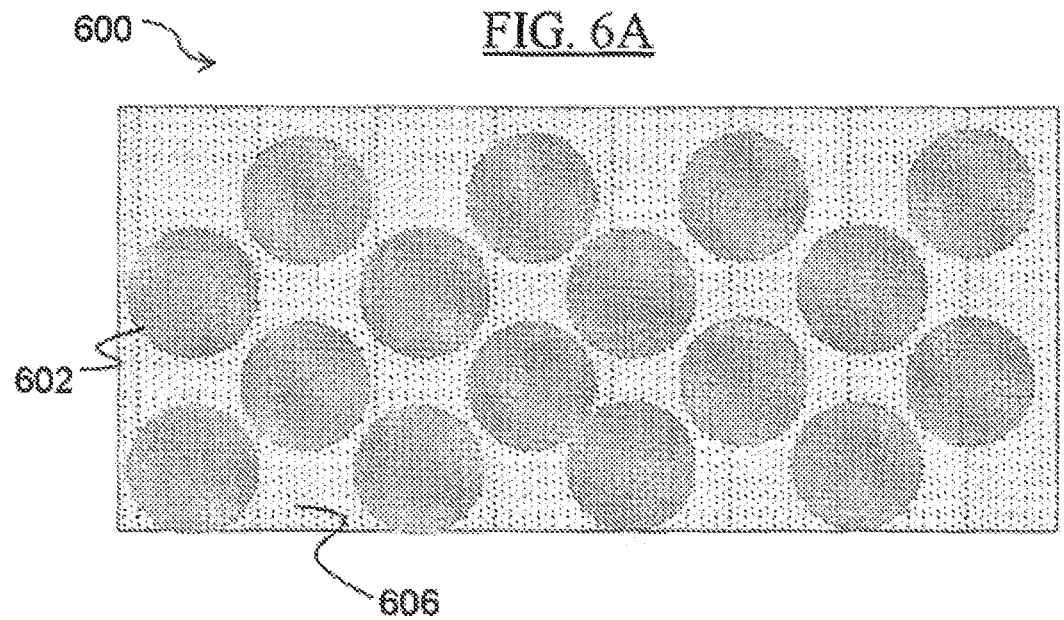
FIG. 6A shows an illustration of a microscopic view of an electrode manufactured by a conventional process.

FIG. 6A shows an electrode 600 produced by a conventional process. In a conventional process, the conductive particles 606 are dispersed throughout the electrode 600, having a random spatial relationship with the electroactive particles 602. The particles are dispersed within a binder that provides adhesion between the particles and to the substrate for current collection.

Figure 6B:
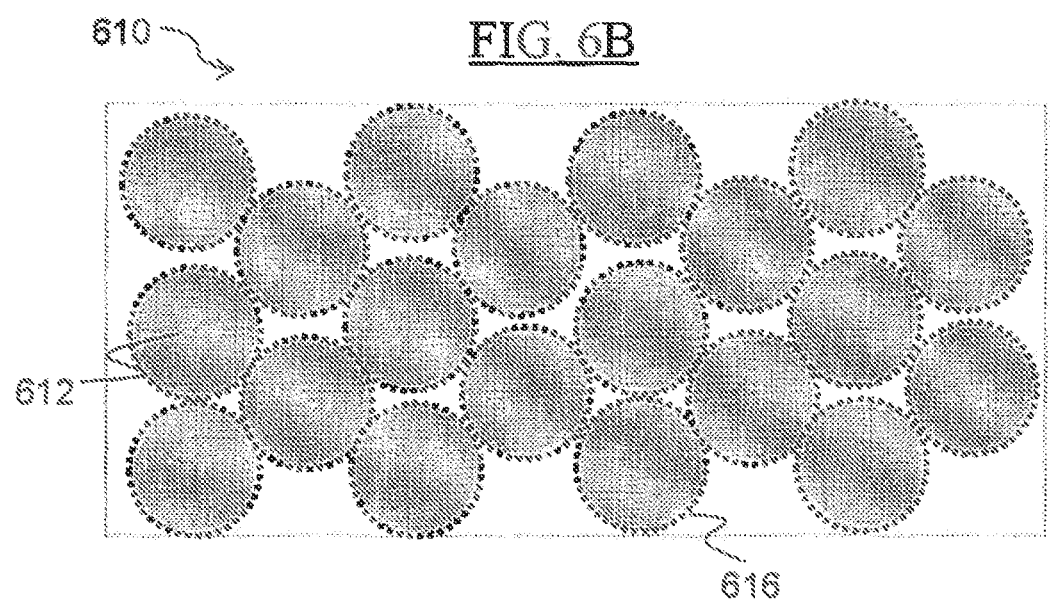
FIG. 6B shows an illustration of a microscopic view of an electrode manufactured in accordance with the subject invention.

FIG. 6B shows an electrode 610 produced via the methods described in FIGS. 5A and 5B. The polymer can be selected such that the nanosized conductive particles 616 are localized near the surface of the electrochemically active particles 612. Each electrochemically active particle 612 and the nanosized conductive particles 616 localized near its surface behaves as a single multi-micron particle. In some embodiments, the nanosized conductive particles 616 are localized within approximately 200 nm of the surface of the electrochemically active particles 612. Additionally, the polymer can be selected such that it is not soluble by any solvents used during electrode preparation such as that described in the method shown in FIG. 5B. The particles are dispersed within a binder that provides adhesion between the particles and to the substrate for current collection.

Figure 7:
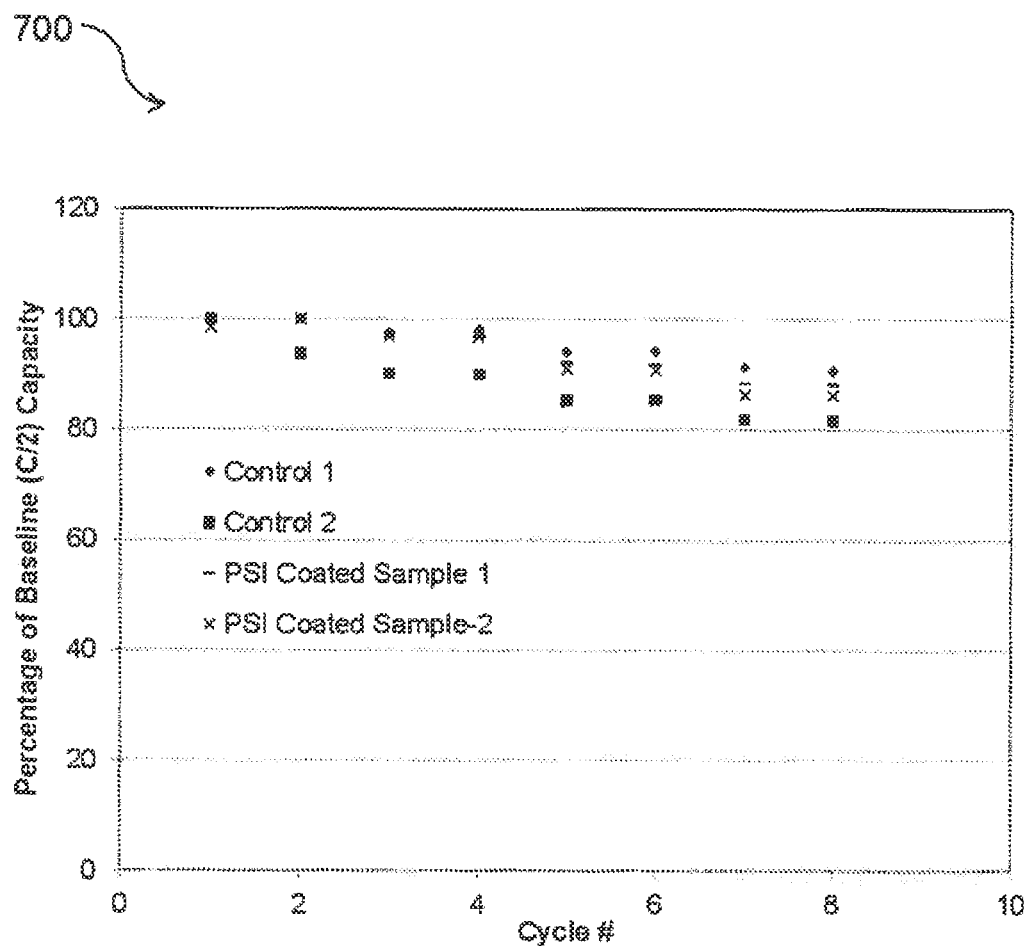
FIG. 7 shows the percentage of baseline capacity plotted against the number of cycles at various discharge rates for electrodes formed using standard formulation techniques and the high active coating techniques described in the present invention.

FIG. 7 shows the percentage of baseline capacity plotted against the number of cycles at various discharge rates for electrodes formed using standard formulation techniques and the high active coating techniques described in the present invention (e.g., the coating and electrode formation processes described in FIGS. 5A and 5B). The performance is equivalent, but the increased active material content of electrodes formed using the high active coating technique results in 9% greater capacity per gram of electrode, resulting in higher energy density cells.

Testing was carried out to demonstrate the discharge rate capacity of electrodes using the high active coating technique was equivalent to those formed by traditional formulation techniques. Two electrodes were formed. The control electrode contained uncoated cathode material (90%) and traditional levels of binder and conductor (5%). Similar electrodes were successfully integrated into 186SO cylindrical cells. Electrodes utilizing the high active coating techniques of the present invention were formed using the same cathode material coated with slightly different amounts of conductor. Electrodes were formed in both cases using 98.5% active material at the same loading as in the control case. Half-cells were constructed and the nominal performance measured at a C/2 charge/discharge rate. The nominal discharge capacity for both electrode systems was equivalent. FIG. 7 shows the capacity retention on successive cell discharge at C/2, 1 C, 2 C, and 3 C rates. FIG. 7 further shows that the rate performance of the electrode formed using the high active coating technique is equivalent to that measured for the control electrodes.

Figure 8:
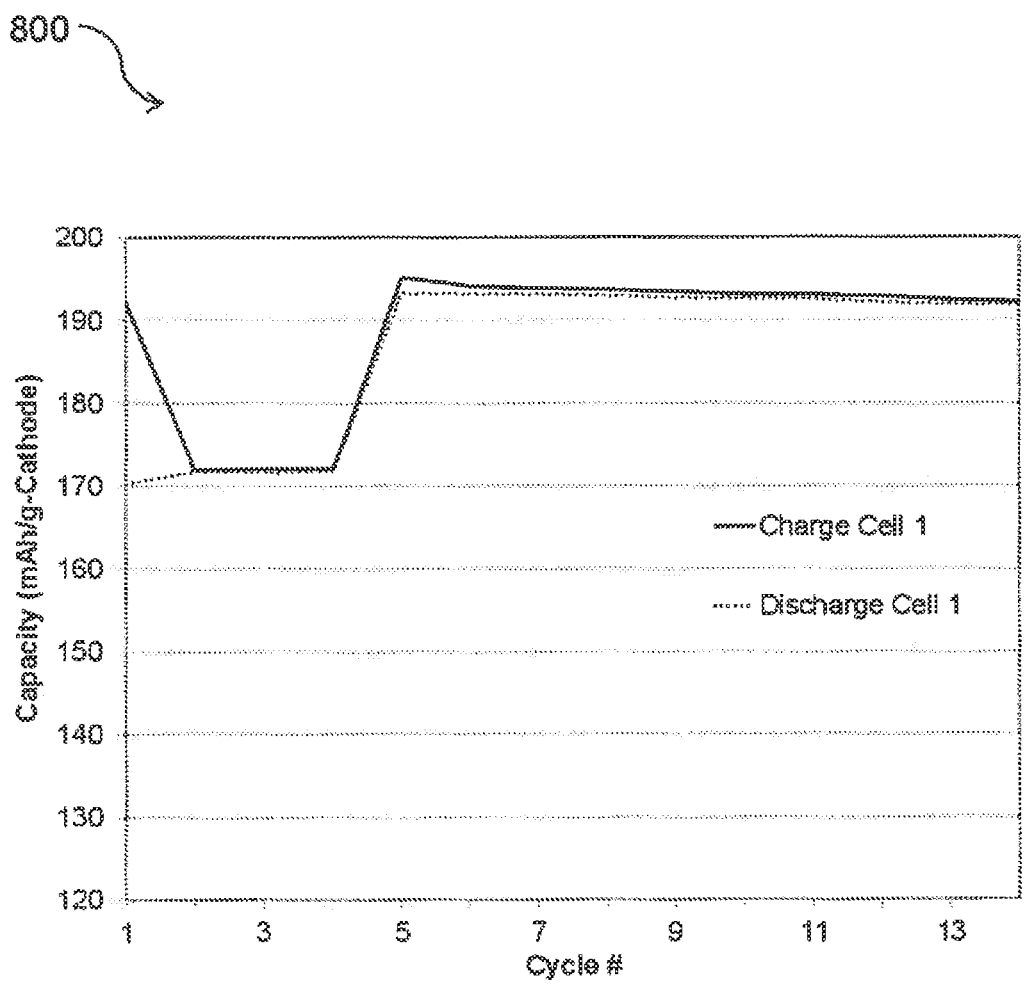
FIG. 8 shows a graph of capacity versus cycle number for a cathode half-cell formed using an electrode manufactured in accordance with the subject invention.
Figure 9:
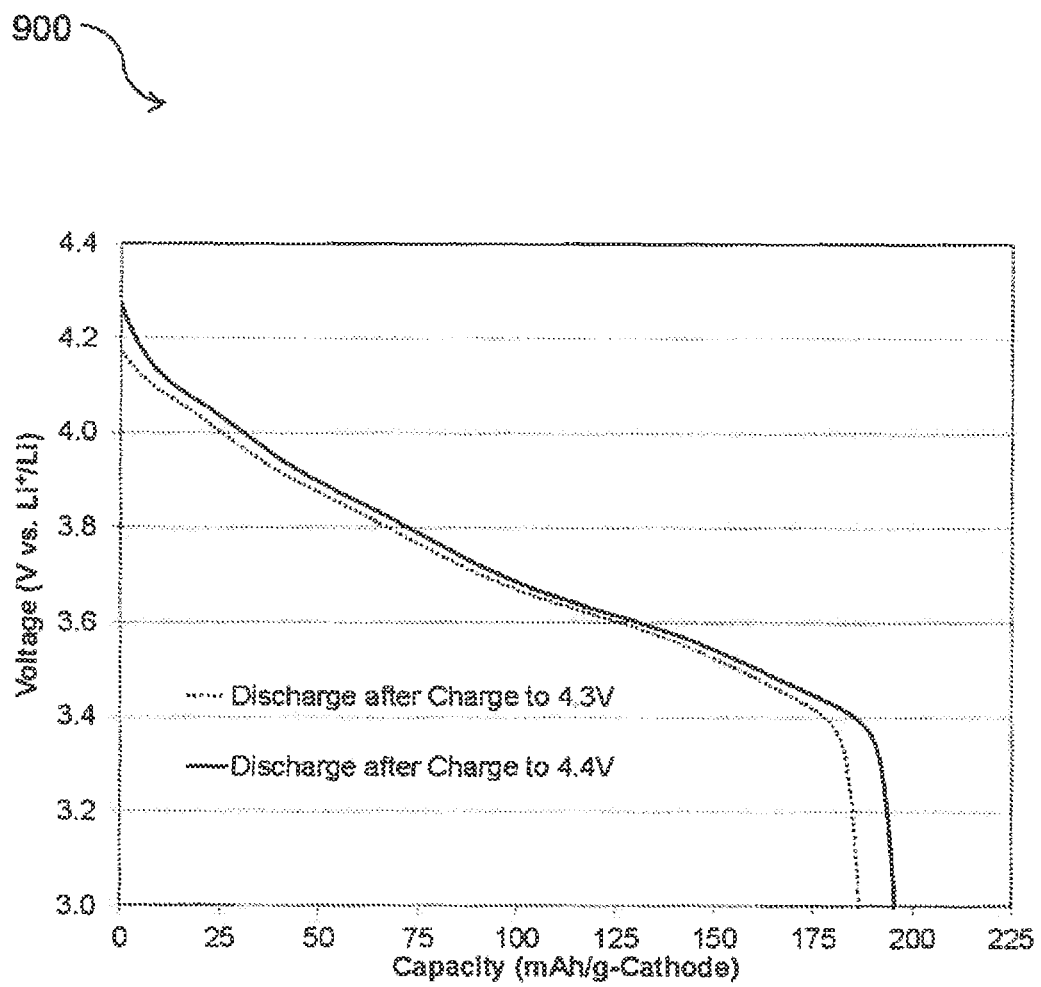
FIG. 9 shows discharge curves for an NCA coated electrode after charging to 4.3 and 4.4V.

FIG. 8 shows a graph of capacity versus cycle number for a cathode half-cell formed using an electrode manufactured according to the high active coating techniques described in the present invention. NCA and NCM-622 type cathode materials were coated in order to demonstrate that the process can be applied to a range of commercially available cathode materials. The coated cathode materials were then formed into electrodes with 98.5% active material and half-cells were constructed for testing. FIG. 8 shows capacity versus number of cycles for the NCM-622 electrode during charge/discharge testing first between 4.3 and 3V and then between 4.5 and 3V. The electrode loading was 2-2.5 $mAh/cm^2$. All testing was performed at a C/3 rate and the results were normalized to the mass of the coated material. No attempts were made to account for the fraction of the coating. It can be seen that the electrode delivers >170 mAh/g-cathode at 4.3V and >190 mAh/g-cathode on charge to 4.5V with reasonably flat performance at the elevated voltages. FIG. 9 shows discharge curves for the NCA coated electrode after charging to 4.3 and 4.4V. The discharge capacity after charging to 4.3V is >185 mAh/g-cathode, consistent with that measured for standard uncoated NCA material. On increasing the voltage to 4.4V, the discharge capacity increased to >195 mAh/g-cathode. This performance level was maintained during subsequent cycling. These results demonstrate the high active coating techniques of the present invention can be applied to a variety of cathode materials. Additionally, the high active coating techniques of the present invention have been successfully applied to $LiCoO_2$ and NCM-111 cathode materials.

Figure 10:
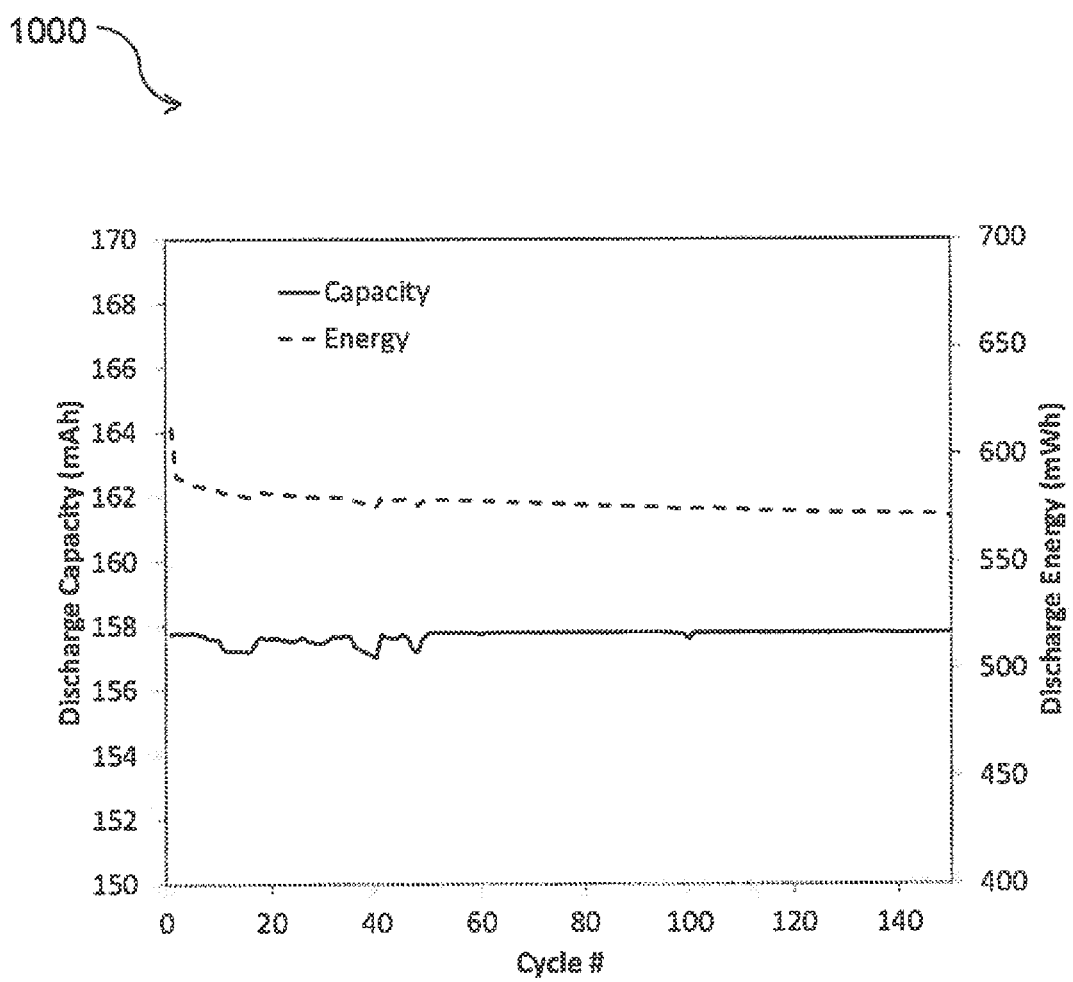
FIG. 10 shows the discharge capacity and energy versus cycle number for a pouch cell constructed using electrodes formed in accordance with the subject invention.

Pouch cells having a capacity of 150 mAh of were constructed to demonstrate the scalability of the high active coating techniques described in the present invention. The pouch cells require multiple electrode layers, thus demonstrating the performance for larger amounts of coated active material. FIG. 10 shows the performance of a pouch cell on cycling in a traditional voltage range (4.1 to 3V) at 80% depth of discharge. The fade in discharge energy is consistent with that measured using cells built using standard formulation techniques. FIG. 10 shows the discharge capacity and energy versus cycle number for a pouch cell constructed using electrodes formed using the high active coating techniques of the present invention. Additionally, FIG. 10 shows that during operation at normal voltage ranges (4.1 to 3V) the pouch cell delivers stable cycling performance.

Figure 11:
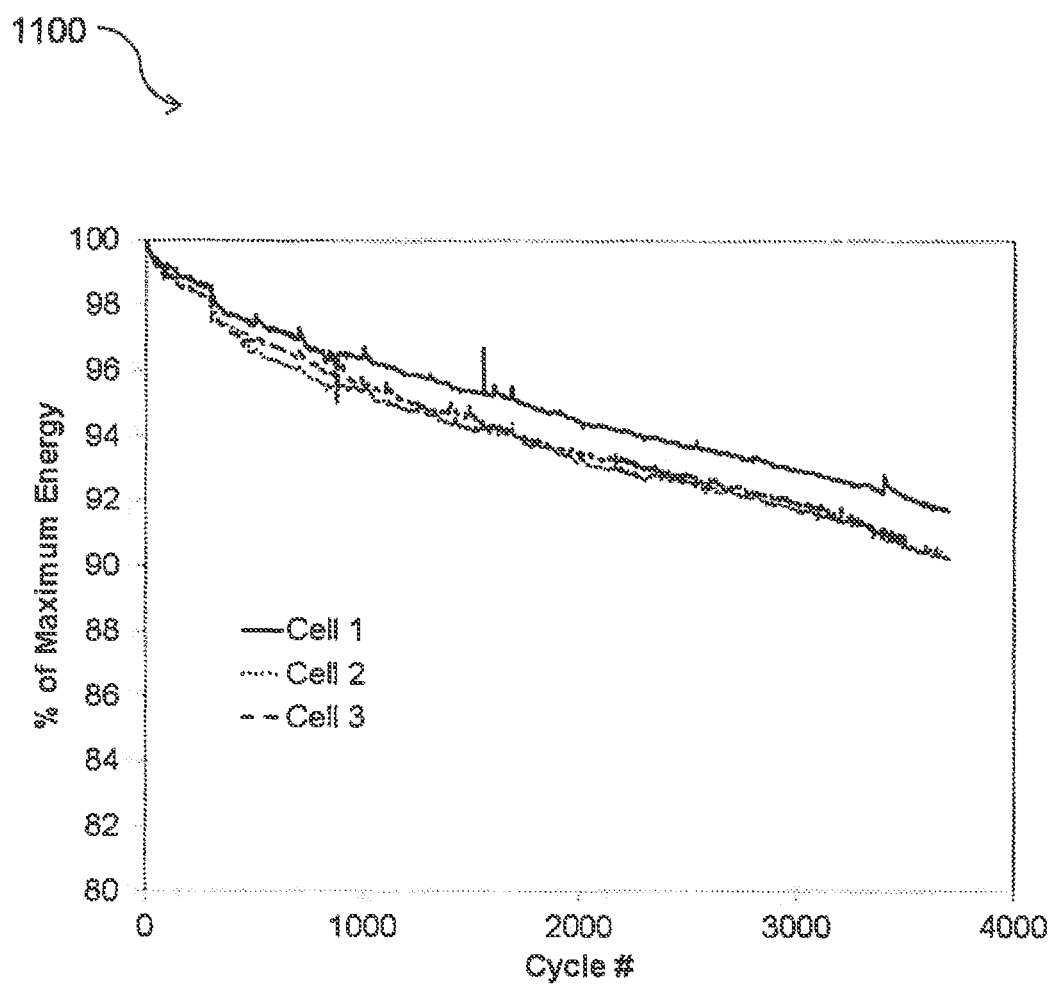
FIG. 11 shows the performance of 3 cells on cycling to a maximum voltage of 4.4V

FIG. 11 shows the performance of 3 cells on cycling to a maximum voltage of 4.4V. The cells were discharged for 30 minutes at a C/3 rate to accelerate the testing cycle. This procedure resulted in the cells continually being exposed to elevated voltages. For cells manufactured using standard formulation techniques, this procedure can result in rapid performance fade. In contrast, after 3500 cycles the fade was <10% in the lowest performing cell indicating good stability at high voltages for the cells manufactured with the high active coating techniques of the present invention. This is believed to be due to the reduced surface area afforded by the subject invention in the final electrode. FIG. 11 thus shows that the electrode can be cycled at elevated voltages with little fade, enabling higher cell energy densities.

Figure 12:
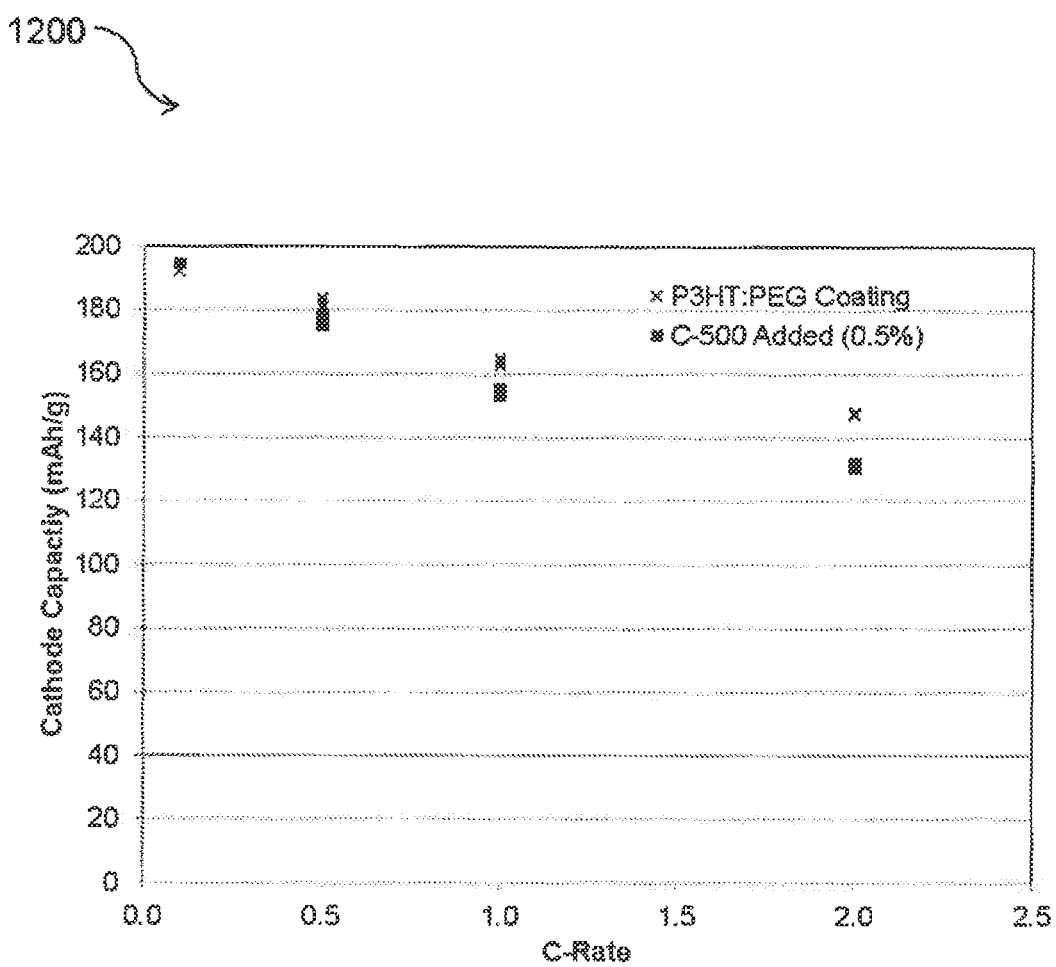
FIG. 12 shows capacity versus C-rate performance where an electroactive polymer, P3HT, is included with a coating in accordance with the subject invention.

FIG. 12 shows capacity versus C-rate performance where an electroactive polymer, P3HT, is included with the coating. In this test 2% PEG was used and 8% P3HT. FIG. 12 shows that the rate performance of electrodes formed without conductive additive, but with P3HT included, was in excess of that achieved when adding conductive additive and performing the coating of the cathode material with only SP and PEG. The results indicate the potential of merging the high active and short-circuit coatings. Continuous production of electrodes was possible with each formulation and pouch cells were successfully constructed demonstrating similar performance as in the small cells. For comparison, the performance of cells with electrodes formed with the baseline coating and 0.5 wt % conductive additive included is shown.

The terminology used herein is for the purpose of describing particular embodiments and is not intended to be limiting of the inventive concepts. It will be understood that, although the terms first, second, third etc. are used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present application.

While the present invention has been particularly shown and described above with reference to exemplary embodiments thereof, it will be understood by those of ordinary skill in the art, that various changes in form and detail can be made without departing from the spirit and scope of the present invention described and defined by the following claims.

The invention claimed is:

1. A coated powder for use in the production of an electrode, said coated powder comprising:
   a plurality of electrochemically active particles;
   a shell made of conductive particles for and about each individual electrochemically active particle;
   a polymer adhering a particle shell about each electrochemically active particle; and
   wherein the powder includes the individual electrochemically active particles each with a shell thereabout made of the conductive particles, and wherein the polymer is insoluble in a solvent used in the production of the electrode and forms, with the conductive particles, a porous layer on the surface of the active particles allowing ion transport.

2. The coated powder of claim 1 wherein the particle shells each comprises particles having a variable conductivity.

3. The coated powder of claim 1 wherein the particle shells each comprises particles that are localized within approximately 200 nm of the plurality of electrochemically active particles.

4. The coated powder of claim 1 wherein the electrochemically active particles are at least one of $LiCoO_2$, NCA, NCM-111, NCM-523, NCM-622, or a lithium metal phosphate.

5. The coated powder of claim 1 wherein each particle shell comprises carbon black.

6. The coated powder of claim 1 wherein each particle shell comprises conductive particles having a size in the range of 5-50 nm.

7. The coated powder of claim 1 wherein the polymer has a solubility of less than 0.002 g/kg of N-methylpyrrolidinone.

8. The coated powder of claim 1 wherein the polymer is polyethylene glycol.

* * * * *